(12) United States Patent
Pozzati et al.

(10) Patent No.: US 8,043,456 B2
(45) Date of Patent: Oct. 25, 2011

(54) METHOD AND AN APPARATUS FOR MANUFACTURING TYRES

(75) Inventors: Giovanni Pozzati, Olgiate Olona (IT); Roberto Rungo, Milan (IT); Claudio Lacagnina, Varese (IT)

(73) Assignee: Pirelli Tyre S.p.A., Milan (IT)

( * ) Notice: Subject to any disclaimer, the term of this patent is extended or adjusted under 35 U.S.C. 154(b) by 877 days.

(21) Appl. No.: 11/597,569

(22) PCT Filed: May 28, 2004

(86) PCT No.: PCT/IB2004/001773
§ 371 (c)(1),
(2), (4) Date: Nov. 27, 2006

(87) PCT Pub. No.: WO2006/000843
PCT Pub. Date: Jan. 5, 2006

(65) Prior Publication Data
US 2008/0041515 A1    Feb. 21, 2008

(51) Int. Cl.
*B29D 30/60*    (2006.01)
(52) U.S. Cl. .................. 156/130; 156/117; 156/397
(58) Field of Classification Search ............ 156/117, 156/130, 397; 425/462, 131.1; 264/211.23, 264/328.8
See application file for complete search history.

(56) References Cited

U.S. PATENT DOCUMENTS

| | | | | |
|---|---|---|---|---|
| 3,170,499 A | * | 2/1965 | Deist | 152/209.5 |
| 3,752,617 A | * | 8/1973 | Burlis et al. | 425/131.1 |
| 4,662,404 A | * | 5/1987 | LeVeen et al. | 138/120 |
| 5,067,885 A | * | 11/1991 | Stevenson et al. | 425/131.1 |
| 6,001,402 A | * | 12/1999 | Dupont | 426/249 |
| 6,039,826 A | * | 3/2000 | Okada | 156/117 |
| 6,196,267 B1 | | 3/2001 | Rutz et al. | |

FOREIGN PATENT DOCUMENTS

| | | |
|---|---|---|
| FR | 2 589 781 | 5/1987 |
| JP | 2002-67121 | 3/2002 |
| WO | WO 00/35666 | 6/2000 |
| WO | WO 01/36185 A1 | 5/2001 |
| WO | WO 2004/041522 A1 | 5/2004 |

OTHER PUBLICATIONS

Kanefuji, Y., "Method and Apparatus for Multilayer Molding," Patent Abstracts of Japan, JP. No. 09052256, Feb. 25, 1997.

* cited by examiner

*Primary Examiner* — Geoffrey L Knable
(74) *Attorney, Agent, or Firm* — Finnegan, Henderson, Farabow, Garrett & Dunner, L.L.P.

(57) ABSTRACT

A robotized arm drives in rotation a drum carrying a tire being processed and conveniently moves it in front of a delivery nozzle supplying a continuous elongated element of elastomer material in order to form a tire component. The delivery nozzle is connected through at least one selecting valve with two or more extruders, each designed to supply a respective blend. The selecting valve connects the delivery nozzle with the outlet of one of the extruders, breaking communication between the nozzle and the other extruders. The outlets of the non-active extruders can be connected with at least one outlet duct. It is thus possible to replace the type of blend used for manufacturing the tire component without the article of manufacture having to be moved away from the delivery nozzle.

28 Claims, 7 Drawing Sheets

METHOD AND AN APPARATUS FOR MANUFACTURING TYRES

CROSS REFERENCE TO RELATED APPLICATION

This application is a national phase application based on PCT/IB2004/001773, filed May 28, 2004, the content of which is incorporated herein by reference.

BACKGROUND OF THE INVENTION

1. Field of the Invention

The present invention relates to a method of manufacturing tyres, and to the manufacturing apparatus to put the method into practice.

2. Description of the Related Art

A tyre generally comprises a carcass structure including at least one carcass ply having end flaps in engagement with respective annular anchoring structures, each of which is usually formed of a substantially circumferential annular insert to which at least one filling insert is applied at a radially outer position.

Associated with the carcass structure is a belt structure comprising one or more belt layers, disposed in radial superposed relationship with respect to each other and to the carcass ply, and having textile or metallic reinforcing cords with a crossed orientation and/or substantially parallel to the circumferential extension direction of the tyre. Applied to the belt structure, at a radially external position, is a tread band made of elastomer material like other semifinished products constituting the tyre.

It is to be herein pointed out, to the aims of the present description, that by the term "elastomer material" it is intended a composition comprising at least one elastomer polymer and at least one reinforcing filler. Preferably, this composition further comprises additives such as a cross-linking agent and/or a plasticizer, for example. Due to the presence of a cross-linking agent, this material can be cross-linked through heating so as to form the final article of manufacture. Respective sidewalls of elastomer material are further applied to the side surfaces of the carcass structure, each extending from one of the side edges of the tread band until close to the respective annular anchoring structure to the beads.

The carcass structure and belt structure together with the respective tread band, may be also provided to be made separately of each other in respective work stations, to be mutually assembled at a later time.

In accordance with conventional building methods the tread band and sidewalls are each made of a continuously extruded section member that, after being cooled to stabilise its geometrical conformation, is stored on suitable tables or reels. The semifinished product in the form of sections or made up of a continuous strip is then sent to a feeding unit the function of which is to pick up the sections or to cut sections of predetermined length from the continuous strip, each of these sections constituting the tread band or one of the sidewalls to be circumferentially applied to the tyre being processed.

In accordance with documents WO 00/35666 and WO 01/36185, in the name of the same Applicant, some tyre components, among which the tread band and sidewalls for example, are obtained through supply of an elongated element from an extruder, to be suitably distributed on the drum carrying the tyre being processed, while the latter is rotated around its own axis. Simultaneously, the support drum hanging from a robotized arm, is moved in front of the extruder to cause a transverse distribution of the elongated element and therefore form a plurality of circumferential coils with the latter, the coils being disposed in axial side by side and/or radial superposition relationship to define the structural tyre component.

In document WO 04/041522, in the name of the same Applicant as well, the carcass structure is provided to be formed through assembling of semifinished products on a support drum, to be subsequently coupled with the belt structure made on an auxiliary drum. The support drum used during the step of coupling the carcass structure with the belt structure is picked up by a robotized arm that will sequentially transfer and conveniently handle it in front of a series of extruders each set to lay on the carcass and/or the belt structure, a respective continuous elongated element of elastomer material having physico-chemical features specifically selected depending on the type of component that the individual extruder is designed to produce. More particularly, a first extruder is set to supply a first continuous elongated element directly against the belt structure, to form the tread band.

When manufacture of the tread band calls for formation of a so-called underlayer, an auxiliary extruder is provided to directly lay an auxiliary elongated element against the belt structure, before intervention of the first extruder, which auxiliary element is designed to form said underlayer of a suitable elastomer material.

A further extruder will supply a third continuous elongated element directly against the carcass ply, simultaneously with winding of the elongated element itself on the carcass structure carried by the drum, to make the tyre sidewalls.

SUMMARY OF THE INVENTION

In the present specification and in the subsequent claims, by "component" of a tyre it is intended any element of elastomer material being part of the tyre, such as the tread band, sidewalls, liner, under-liner, fillers in the bead region, reinforcing inserts in run-flat tyres, antiabrasive elongated elements, or part thereof. In particular, when the sidewalls and/or the tread band for example are made of two or more distinct parts, each made up of a specific elastomer material, by "component" it is intended each of said parts of the sidewall and/or the tread band.

The Applicant has verified that when tyres are manufactured following the above illustrated methods there is some waiting time, during the tyre manufacture, each time it is necessary to change the extruder in order to change the elastomer material constituting the continuous elongated element required for manufacturing a given component of the tyre being processed. Said waiting time is mainly due to the great moving masses (a tyre being processed on a support element moved by a robotized arm, for example) giving rise to rather long times for stopping, new positioning and restarting of the "tyre being processed-extruder" system, with an order of magnitude approximately of ten seconds.

The Applicant could also ascertain that to make tyre components using a plurality of different elastomer materials, such as a tread band having several portions of different elastomer materials superposed on each other and/or disposed in side by side relationship, the number of the extruders is to be increased and consequently there will be an increase in the area taken up by the lay-out of the whole installation in order to face the above requirement.

The Applicant realised that by arranging at least one dispenser operatively associated with a distributing device adapted to selectively supply different types of elastomer material coming from two or more extruders respectively, so as to form different components of the tyre without being necessarily obliged to transfer the support element on which said components are built from an extruder to another, productivity is increased, said waiting time being reduced without increasing the sizes of the lay-out of the production installation.

In a first aspect, the invention relates to a method of manufacturing tyres, comprising the steps of:
assembling components of a tyre being processed on a support element;
wherein at least one first component is formed through winding of at least one first continuous elongated element into coils arranged one against the other, which first element is made up of a first elastomer material coming from a first extruder;
wherein at least one second component is formed through winding of at least one second continuous elongated element into coils arranged one against the other, which second element is made up of a second elastomer material coming from a second extruder;
further comprising the steps of:
conveying the first and second elastomer materials into converging paths, connected with at least one dispenser;
positioning the support element in front of said at least one dispenser;
selectively enabling supply of the first and the second elastomer material through said at least one dispenser, to form the first and second continuous elongated elements, respectively;
conveniently moving the support element in front of said at least one dispenser for winding and distributing the first and second continuous elongated elements, respectively, so as to form the first and second components in succession.

In another aspect, the invention relates to an apparatus for manufacturing tyres, comprising:
at least one support element;
devices for assembling components of a tyre being processed on the support element;
wherein said assembling devices comprise:
a first extruder to supply a first elastomer material;
a second extruder to supply a second elastomer material;
actuating devices designed to carry out a relative movement between said support element and the extruders;
at least one dispenser communicating with the first and second extruders through a first and a second connecting ducts respectively, to form a first and a second continuous elongated elements, consisting of said first and second elastomer materials, respectively;
switching over devices to selectively enable supply of the first and second elastomer materials through said at least one dispenser.

Further features and advantages will become more apparent from the detailed description of a preferred, but not exclusive, embodiment of a method and an apparatus for manufacturing tyres, in accordance with the present invention.

BRIEF DESCRIPTION OF THE DRAWINGS

This description will be taken hereinafter with reference to the accompanying drawings, given by way of non limiting example, in which.

DETAILED DESCRIPTION OF THE INVENTION

Referring particularly to the drawings, an apparatus for manufacturing tyres, set to put into practice a method in accordance with the present invention, has been generally identified with 1.

Figure 7:
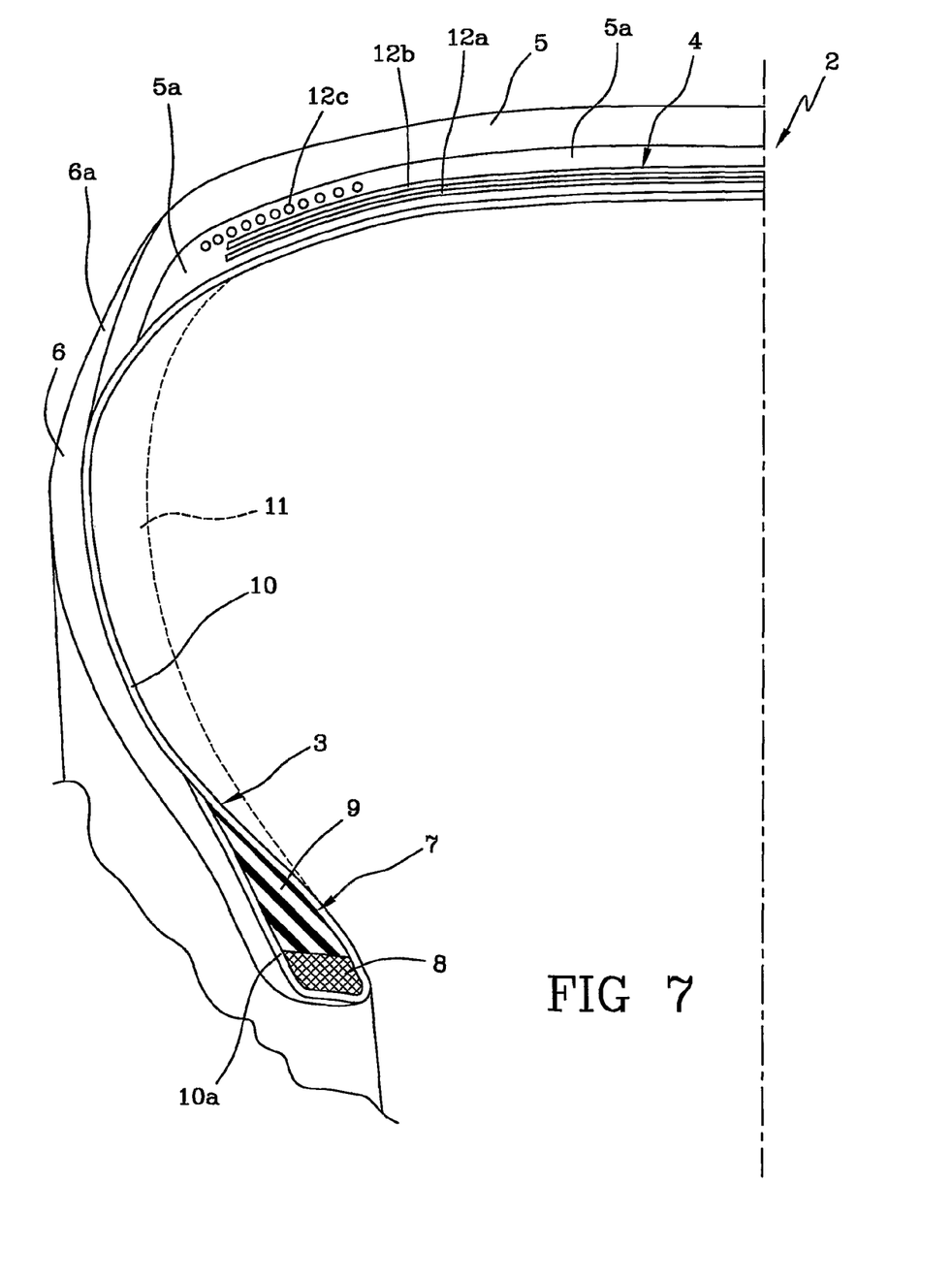
FIG. 7 is a fragmentary cross-sectional view of a tyre obtainable in accordance with the present invention, given just as an indication.

The invention aims at manufacturing tyres of the type generally denoted at 2 in FIG. 7, which essentially comprise a carcass structure 3 of substantially toroidal conformation, a belt structure 4 of substantially cylindrical conformation and radially extending around the carcass structure 3, a tread band 5 applied to the belt structure 4 at a circumferentially external position, and a pair of sidewalls 6 laterally applied to the carcass structure 3, on opposite sides.

Each of the sidewalls 6 and the tread band 5 essentially comprise at least one layer of elastomer material of suitable thickness. Also associated with the tread band 5 can be, a so-called underlayer 5a of elastomer material having suitable composition and physico-chemical features, and acting as an interface between the true tread band and the underlying belt structure 4.

The carcass structure 3 comprises a pair, of annular anchoring structures 7, integrated into regions usually identified as "beads" and each consisting of a substantially circumferential annular insert 8, usually called "bead core", carrying an elastomer filler 9 at a radially external position. Turned up around each of the annular anchoring structures are the end flaps 10a of at least one carcass ply 10 comprising textile or metallic cords extending transversely of the circumferential extension of tyre 2, possibly according to a predetermined inclination, from one of the annular anchoring structures 7 to the other. Finally in tyres of the tubeless type, i.e. without an air tube, the carcass structure has a substantially airtight layer of elastomer material generally referred to as "liner".

Also provided in run-flat tyres or tyres intended for particular uses, can be auxiliary reinforcing inserts 11, of the type usually called "sidewall inserts" applied to a region close to the sidewalls 6 either internally of the carcass ply 10 as identified with a chain line, or between two paired carcass plies.

The belt structure 4 can in turn comprise one or more belt layers 12a, 12b including metallic or textile cords suitably inclined to the circumferential extension of the tyre, in respectively crossed orientations between one belt layer and the other one, as well as a possible outer belting layer 12c comprising one or more cords circumferentially wound up into coils disposed axially in side by side relationship around the belt layers 12a, 12b.

Apparatus 1 is provided with devices for assembling the components of tyre 1, or at least one of them, on at least one support element set to carry the individual component and/or the tyre being manufactured.

Depending on the uses and the concerned process steps, this support element can be represented by a usual building or assembling drum 14 of cylindrical conformation, currently used for assembling the components co-operating in forming the carcass structure, or by the tyre being processed, mounted on a shaping drum 15 for example, used for obtaining assembling of the belt structure 4 on the carcass structure 3, as exemplified in the accompanying figures. Alternatively, should the tyre be manufactured by use of elementary semi-finished elements such as continuous elongated elements of elastomer material, and/or one or more textile or metallic cords incorporated into a layer of elastomer material, the support element may comprise a stiff toroidal support conforming in shape to the inner surfaces of the tyre itself, as disclosed in documents WO-00/35666 and WO-01/36185 in the name of the same Applicant.

In the embodiment therein described the main components of the carcass structure 3 and the belt structure 4, such as in particular the annular anchoring structures 7, carcass plies 10, belt layers 12a, 12b and further possible reinforcements designed to constitute the outer belting layer 12c are supplied to apparatus 1 in the form of semifinished products, produced during preceding manufacturing steps, to be suitably assembled with each other.

To this aim, said assembling devices preferably comprise a building station 13, not described in detail as it can be accomplished in any convenient manner, which has a building or assembling drum 14 acting as a support element for assembling the components of the carcass structure 3. In more detail, the carcass ply or plies 10 are first wound up on the building drum 14, after possible formation of said liner, so as to form a so-called "carcass sleeve" which is substantially cylindrical. Then the annular anchoring structures 7 are fitted on the end flaps 10a of the plies 10 and afterwards said end flaps are turned up so as to cause engagement of the anchoring structures in the loops consequently formed by the turned-up plies 10. If required, the building station 13 may comprise devices for associating the auxiliary reinforcing inserts 11 or inserts of any other type with the carcass ply or plies, said inserts being applied during preliminary steps or alternated with the steps of laying the ply or plies 10 and/or other components of the carcass structure 3.

When assembling of the carcass structure 3 has been completed, the latter can be transferred onto a so-called shaping drum 15, by means of suitable transfer devices not shown.

Alternatively, assembling of the carcass structure components can be carried out directly on the shaping drum 15.

Simultaneously with assembling of the carcass structure 3 on the building drum 14 or directly on the shaping drum 15, manufacture of the belt structure 4 takes place on an auxiliary drum 16 by means of application devices 17.

Upon the action of appropriate transfer devices 18, not described in detail as they can be obtained in any convenient manner, the belt structure 4 lends itself to be picked up from the auxiliary drum 16 and transferred onto the carcass structure 3 disposed in the form of a cylindrical sleeve on the shaping drum 15.

The carcass structure 3 is then shaped into a toroidal configuration, through axial moving of the annular anchoring structures 7 close to each other and simultaneous admission of fluid under pressure thereinto, until the carcass ply or plies 10 are brought into contact with the inner surface of the belt structure 4 retained by the transfer member 18.

In accordance with the present invention, two or more components of the tyre 2 being processed are each formed through a spiralling operation, i.e. by winding at least one continuous elongated element of elastomer material into coils arranged one against the other. In the embodiment herein described by way of example, a first, second, and third one of these components is represented by the underlayer 5a, tread band 5, sidewalls 6 respectively, although said components may comprise any other element of different type.

To this aim, the assembling devices involve use of at least one first extruder 19 set to supply a first elastomer material, suitable to formation of the underlayer 5a for example, and one second extruder 20 to supply a second elastomer material suitable to formation of the thread band 5 to be disposed at a radially external position with respect to the underlayer 5a.

Extending from the first and the second extruder 19, 20 is a first and a second connecting duct 21, 22 respectively, said ducts being directed towards at least one dispenser, following substantially converging paths, to convey the first and second elastomer materials to the dispenser itself and obtain supply of a first and a second continuous elongated element made up of the first and second elastomer material, respectively.

Preferably, said dispenser comprises a delivery nozzle 23.

Switching over devices 24 associated with the extruders 19, 20 selectively enable supply of the first and the second elastomer material through the delivery nozzle 23. In a possible embodiment, the first and second connecting ducts 21, 22 can converge towards the delivery nozzle 23 at respective distinct delivery ports. In this case, selective supply of the first and second elastomer material can be obtained by causing activation and deactivation of the respective extruders 19. 20.

However, it is preferably provided for the first and second connecting ducts 21, 22 to converge towards the same outlet port set in the delivery nozzle 23. In this case, the switching over devices 24 comprise at least one valve unit 25 essentially comprising a valve body 26 operatively engaging a distributing member 27.

Figure 3:
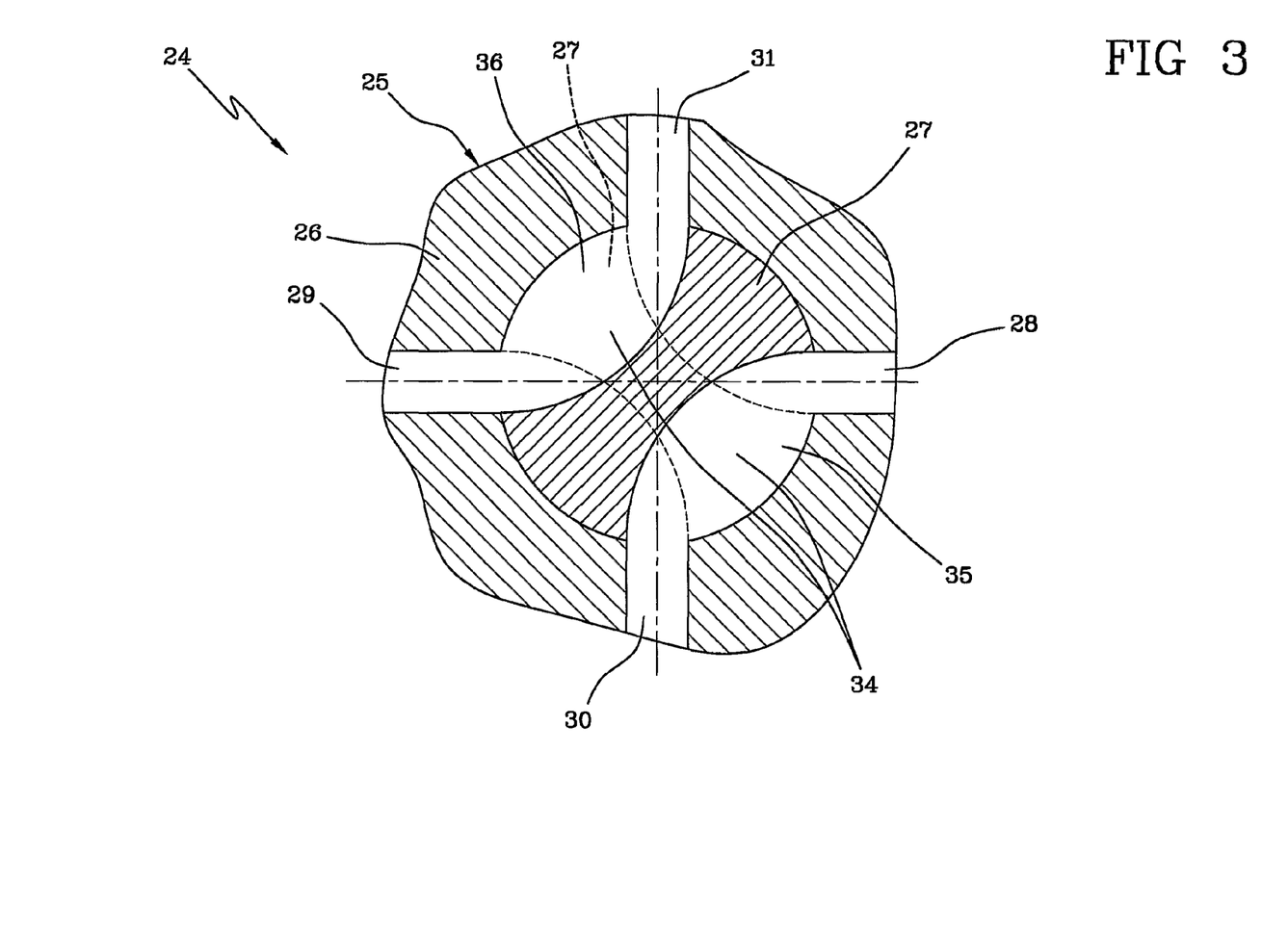
FIG. 3 is a diagrammatic sectional view of a switching valve being part of the apparatus referred to in the preceding figures.

In a first embodiment, represented in FIG. 3, the valve body 26 has a first inlet 28 and a second inlet 29 preferably placed at diametrically opposite positions, and in communication with the first extruder 19 and second extruder 20 respectively, through the first and second connecting ducts 21. 22.

The valve body 26 further has a primary outlet 30 and an auxiliary outlet 31, preferably disposed at diametrically opposite positions, and angularly offset with respect to the first and second inlets 28, 29.

The primary outlet 30 is in communication with the delivery nozzle 23. In particular, the delivery nozzle 23 can be directly formed on the valve body 25, so that it has an outflow port consisting of the same primary outlet 30.

The auxiliary outlet 31 in turn is in communication with an outlet duct 32 opening into a collecting vessel 33.

The inlets 28, 29 and outlets 30, 31 communicate with a distributing chamber 34 defined in the valve body 26 within which the distributing member 27 is operatively housed. In more detail, the distributing member 27 essentially comprises a partition element diametrically extending in the distributing chamber 34 so as to divide the latter into a first passageway 35 and a second passageway 36, in communication with the first inlet 28 and the second inlet 29, respectively.

Upon command of a rotary actuator or equivalent devices not shown, the distributing member 27 is angularly movable, through rotations of 90°, between a first operating condition at which the primary outlet 30 communicates with the first inlet 28, while the auxiliary outlet 31 is in communication with the second inlet 29, and a second operating condition represented in chain line in FIG. 3, at which the primary outlet 30 communicates with the second inlet 20, while the auxiliary outlet 31 is in communication with the first inlet 28.

Consequently, when the distributing member 27 is in the first operating condition, supply of the first elastomer material coming from the first extruder 19 is enabled, whereas the second elastomer material coming from the second extruder 20 is deviated towards the collecting vessel 33.

Vice versa, in the second operating condition, supply of the second elastomer material through nozzle 23 is enabled, whereas the first elastomer material coming from the first extruder 19 is deviated towards the collecting vessel 33.

Thus switching over in supplying the first and second elastomer materials can be carried out in an immediate manner without the occurrence of undesirable flow rate discontinuities in the material coming out of nozzle 23. Each of said first and second extruders 19, 20 in fact can be advantageously activated in advance and deactivated with delay with respect to opening and closing respectively of the fluid communication between the delivery nozzle 23 and the extruder 19, 20 itself.

In more detail, assuming that supply is to be switched over from the first to the second elastomer material, the second material is fed along the second connecting duct 22 conveniently in advance with respect to the movement of the distributing member 27, so that at the moment switching over takes place, the material flow already has the optimal pressure and flow rate conditions in the respective second passageway 36. In turn, feeding of the first material along the respective connecting duct 21 can be advantageously broken with a slight delay after switching over.

During supply of the first or second elastomer material, actuating devices 37 carry out a relative movement between the extruders 19, 20 and the tyre being processed 2 or other support element used to form the components by spiralling.

More particularly, the actuating devices 37 operate on the shaping drum 15 to drive it in rotation around a geometric axis thereof, so that the elongated element delivered by nozzle 23 is circumferentially distributed relative to the carcass structure 3. Simultaneously, the actuating devices 37 carry out controlled relative displacements between the shaping drum 15 and the delivery nozzle 23, to distribute the elongated element in the form of coils arranged one against the other to form the desired component having predetermined requisites of thickness and geometrical conformation.

In a preferential embodiment, the actuating devices 37 are integrated into at least one robotized arm 38a, 38b carrying an end head 39 set to engage the shaping drum 15 in cantilevered fashion. In the example shown (see FIG. 2) the robotized arm 38a, 38b comprises a bed 40 rotatable on a fixed platform 41 around a first vertical axis, a first section 42 linked to the bed 40 in an oscillatable manner around a preferably horizontal second axis, a second section 43 linked to the first section 42 in an oscillatable manner around a third axis, which is preferably horizontal as well, and a third section 44 rotatably supported by the second section 43 and movable around an axis perpendicular to the third oscillation axis. The head 39 of the robotized arm 38a, 38b is connected at the end with the third section 44, being susceptible of oscillation around a fifth and a sixth oscillation axes perpendicular to each other, and rotatably carries the shaping drum 15, drivable in rotation by a motor 45.

Figure 2:
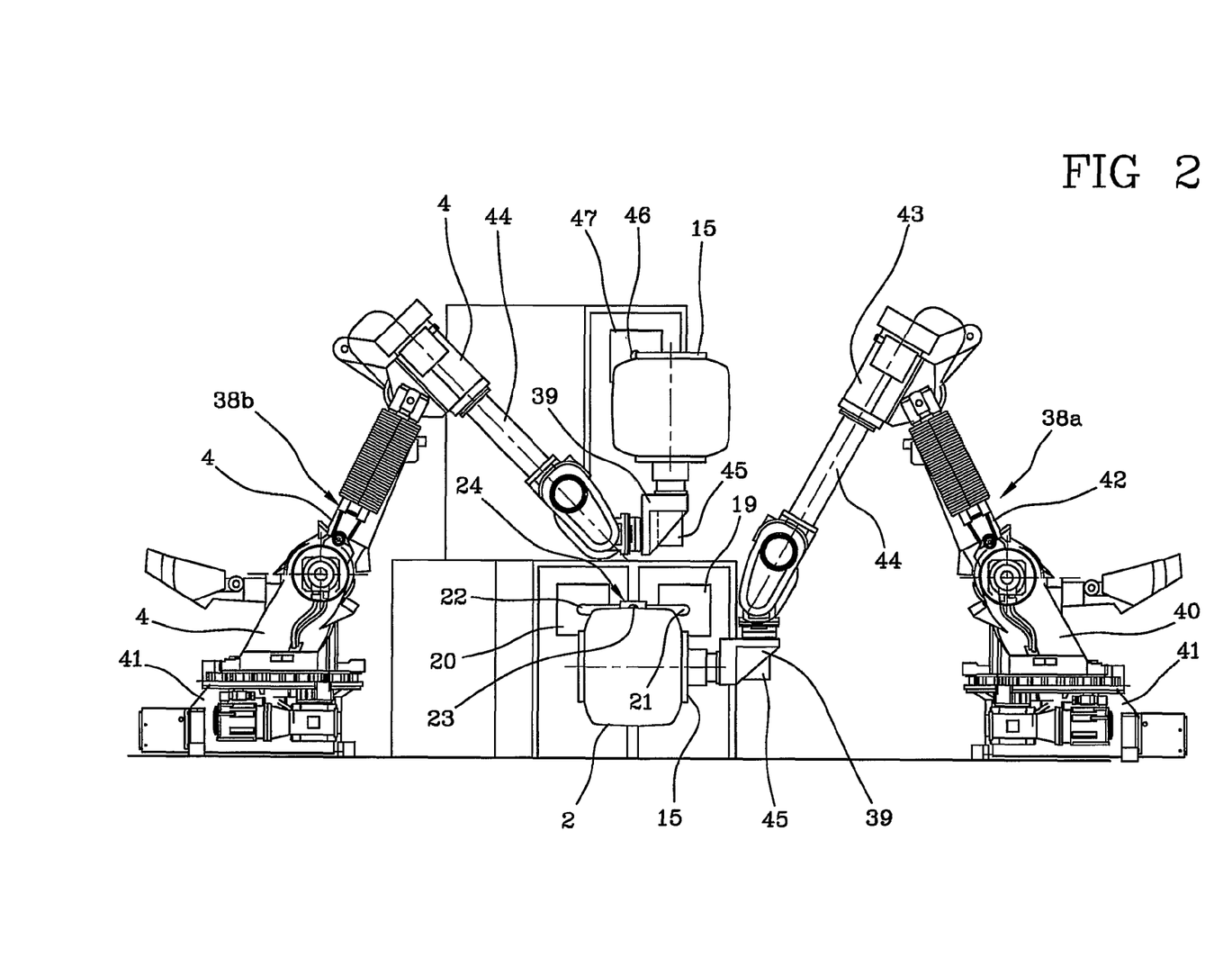
FIG. 2 is an elevation view of a portion of a different embodiment of the apparatus in accordance with the invention.

In a possible embodiment of the invention, the robotized arm 38a, 38b is adapted to support and control movement of the shaping drum 15 during the production cycle.

Preferably, the robotized arm 25a, 25b after positioning the shaping drum 15 in such a manner as to allow engagement of the carcass structure 3 therewith, brings the drum itself to a position coaxial with the transfer member 18 of the belt structure 4. After engagement of the belt structure 4 on the carcass structure 3 has taken place following conformation of the carcass structure 3 into a toroidal shape, the robotized arm 38a, 38b conveniently positions and moves the shaping drum 15 in front of the delivery nozzle 23, to cause formation of the underlayer 5a and tread band 5, for example.

In particular, first the underlayer 5a is made, through delivery of the first elastomer material from nozzle 23. To this aim, the distributing member 27 of the valve unit 25 shall be set at the first operating condition, so as to open the fluid communication between the delivery nozzle 23 and the first extruder 19 and stop the fluid communication between the nozzle itself and the second extruder 20, in order to enable supply of the first continuous elongated element.

When formation of the underlayer 5a has been completed, the distributing member 27 is switched over to the second operating condition, so as to open the fluid communication between the delivery nozzle 23 and the second extruder 20, and to break the fluid communication between the nozzle itself and the first extruder 19, in order to enable supply of the second continuous elongated element onto the tyre 2 being processed, without requiring it to be moved away from the delivery nozzle.

In the embodiment better shown in FIG. 2, manufacture of the sidewalls 6 relies on at least one auxiliary delivery nozzle 46 fed by a third extruder 47 to supply a third continuous elongated element directly against the carcass ply 10, simultaneously with winding of the elongated element itself on the carcass structure 3 carried by the shaping drum 15.

For the purpose, after formation of the tread band 5 at the delivery nozzle 23, the shaping drum 15 is transferred to the auxiliary delivery nozzle 46 and suitably moved in front of the latter to cause formation of one of the sidewalls 6 laterally against the carcass structure 3. Following overturning of the shaping drum 15 in front of the auxiliary delivery nozzle 46, formation of the second sidewall 6 starts on the opposite carcass structure side with respect to the previously formed sidewall 6.

When manufacture of the tread band 5 and sidewalls 6 has been completed, the robotized arm 21a, 21b moves the shaping drum 15 again to position it in front of devices (not shown) carrying out disengagement of the assembled tyre 2 from the shaping drum 15.

Figure 1:
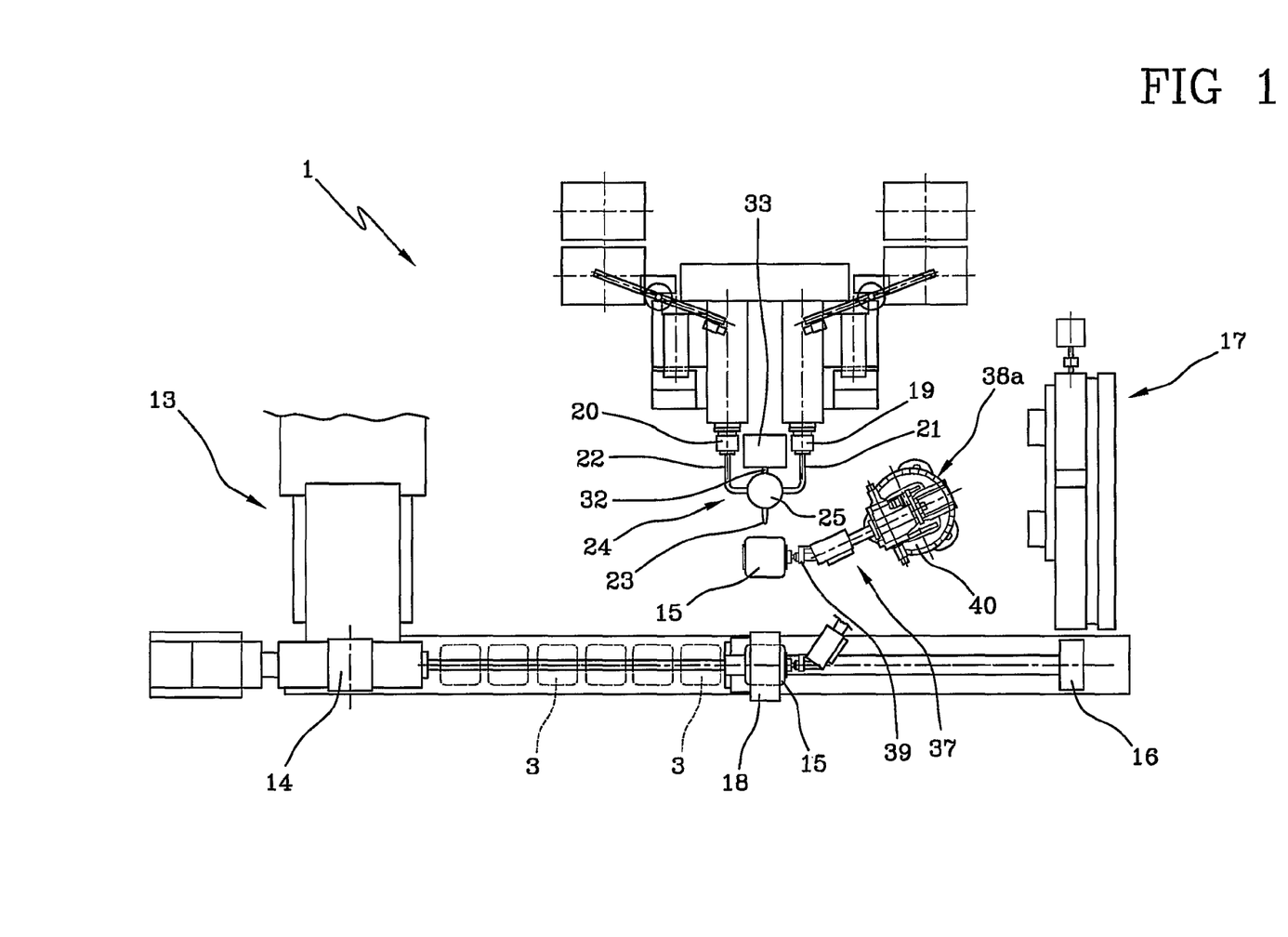
FIG. 1 diagrammatically shows from top, an apparatus for manufacturing tyres in accordance with a first embodiment of the present invention.

Apparatus 1 can be arranged so as to simultaneously carry out working of two tyres 2. To this aim, as viewed from FIGS. 1 and 2, apparatus 1 is provided with a first and a second shaping drum 15 carried by a first and a second robotized arms 21a, 21b respectively, to be sequentially brought to interact with the devices for application of the carcass structure 3, the transfer member 18 of the belt structure 4, the delivery nozzle 23 for application of the underlayer 5a and the tread band 5, as well as with the auxiliary delivery nozzle 46, if any, for application of the sidewalls 6.

The manufacturing steps of the tyre are cyclically carried out following a controlled rhythm on each of the shaping drums 15.

The step of disposing the carcass structure 3 on either shaping drums 15 indifferently is carried out before manufacture of the tyre on the other shaping drum 15 has been completed. Thus the waiting downtime of the tyres being processed in the different steps of the process is avoided, and it is eliminated the risk of the same step being simultaneously carried out on both tyres under working.

Figure 4:
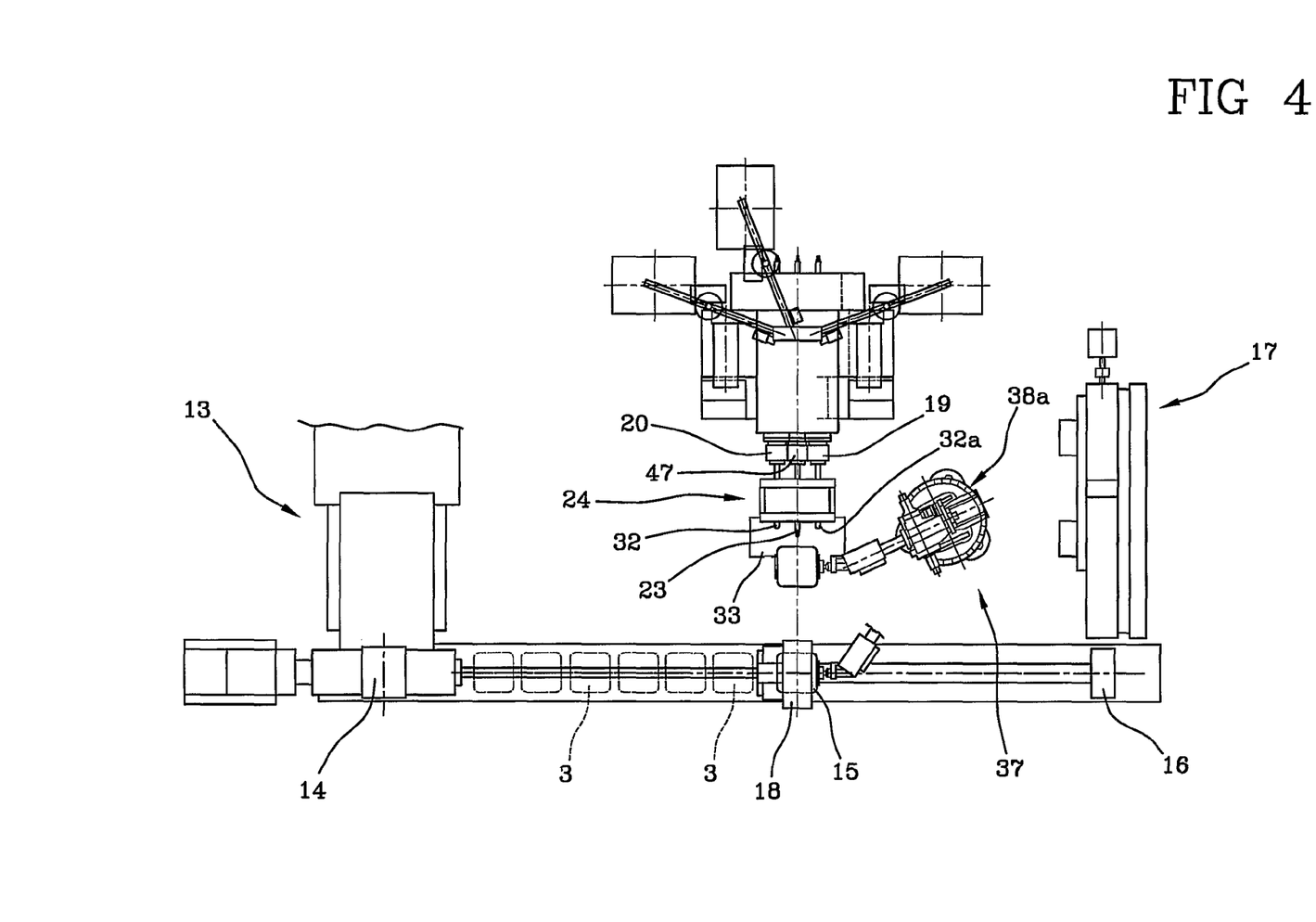
FIG. 4 is a diagrammatic view from top of an apparatus to manufacture tyres in accordance with a possible alternative embodiment of the present invention.

In accordance with a possible alternative embodiment of the invention shown in FIG. 4, the third extruder 47 can be connected with the delivery nozzle 23 by a third connecting duct 48 to allow supply of a third elastomer material through the nozzle 23 itself.

In this case, the switching over devices 24 will be set to enable delivery of the third elastomer material through the delivery nozzle 23, in a selective manner with respect to delivery of the first and second elastomer material supplied by the first extruder 19 and the second extruder 20, respectively.

Figure 5A:
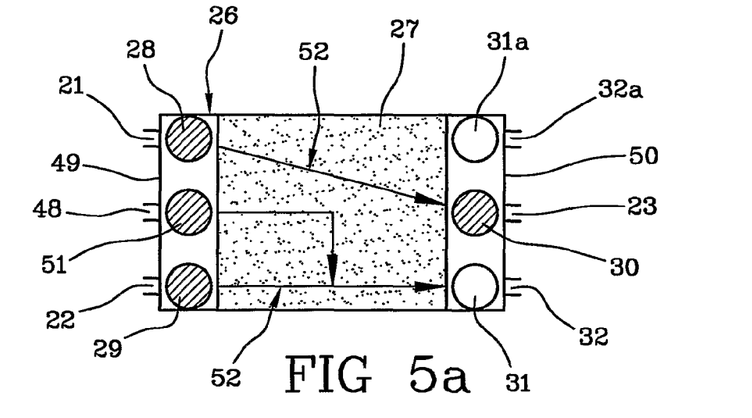
FIGS. 5a, 5b and 5c diagrammatically show a switching valve being part of the apparatus in FIG. 4, under three different operating conditions.
Figure 5B:
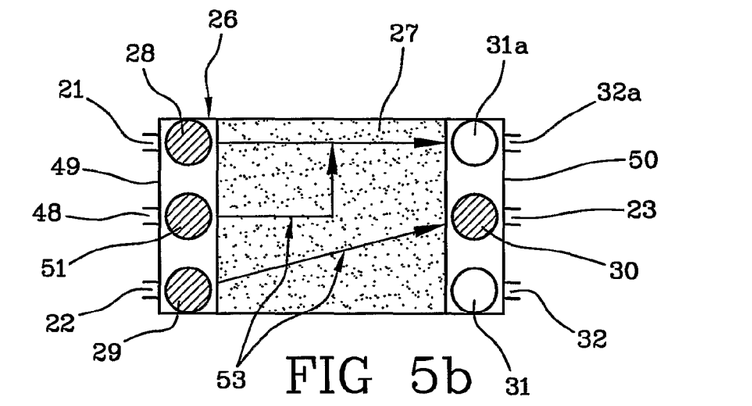
Figure 5C:
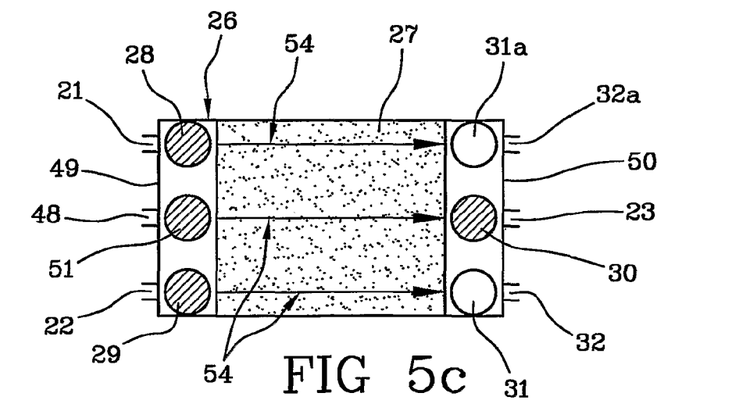

To this aim, the valve unit 25 is preferably made as shown in FIGS. 5a, 5b and 5c. In particular, the valve body 26 is provided to have an inlet side 49 and an outlet side 50 placed on opposite sides with respect to the distributing member 27, linearly movable within the valve body itself.

The first and second inlets 28, 29 connected with the first and second extruders 19, 20 are disposed respectively in alignment on the inlet side 49 together with the third inlet 51 communicating with a third extruder 47 through the third connecting duct 48.

The primary outlet 30 and auxiliary outlet 31 are in turn disposed at respectively aligned positions on the outlet side 50 of the valve body 26, together with a possible second auxiliary outlet 31a connected with the collecting vessel 33 through an auxiliary outlet duct 32a.

Upon command of a linear actuator or equivalent means not shown, the distributing member 27 can be selectively placed in a first, a second and a third operating positions, shown in FIGS. 5a, 5b and 5c respectively.

The distributing member 27 is movable at right angles to the alignment direction of the inlets 28, 29, 51 and the outlets 30, 31 and 31a along the inlet side 49 and the outlet side 50, i.e. at right angles to the sheet of drawings looking at FIGS. 5a, 5b, 5c.

In the first operating condition, a first series of channels 52 extending in the distributing member 27, from the inlet side 49 to the outlet side 50 of the valve body 26, connects the first inlet 28 with the primary outlet 30 to cause delivery of the first elastomer material through the delivery nozzle 23. Simultaneously, the second inlet 29 and third inlet 51 are connected with the outlet duct 32, through the auxiliary outlet 31 as shown in FIG. 5a, and delivery of the second and third elastomer material is interrupted.

In the second operating condition, a second series of channels 53 extending from the inlet side 49 to the outlet side 50 connects the primary outlet 30 with the second inlet 29, to cause delivery of the second elastomer material through the delivery nozzle 23, while the first inlet 28 and third inlet 51 are connected with the auxiliary outlet 31a as shown in FIG. 5b, and delivery of the first and third elastomer material is interrupted.

In the third operating condition, a third series of channels 54 connects the primary outlet 30 with the third inlet 51, to cause delivery of the third elastomer material through the delivery nozzle 23, while the first and second inlets 28, 29 communicate with the outlet duct 32 through the auxiliary outlets 31a, 31 respectively, delivery of the first and second elastomer material being interrupted.

By conveniently positioning the distributing member 27 to the first, second and third operating conditions it is therefore possible to selectively enable delivery of the first, the second and the third elastomer materials through the same delivery nozzle 23 connected with the primary outlet 30. Thus it is possible to make at least one first, one second and one third component of tyre 1 without the tyre itself, or other support element intended for formation of the components, being required to be moved away from the delivery nozzle 23.

In particular, the sidewalls 6 or other component to be formed with the third elastomer material can be obtained by conveniently moving the tyre 2 being processed or other support element in front of the delivery nozzle 23, to cause a correct distribution of the third continuous elongated element. When manufacture of the sidewalls 6 or other component made of the third elastomer material has been completed, the distributing member 27 is shifted from the third operating condition to stop fluid communication between the delivery nozzle and the third extruder 47, and open fluid communication between the third extruder itself and the outlet duct 32.

As already described with reference to the first and second extruder 19, 20, the third extruder 47 as well can be activated in advance and deactivated with delay with respect to opening and closing of the fluid communication with the delivery nozzle 23, to ensure a continuous supply of the elastomer material also during the switching over steps.

According to a further alternative embodiment shown in FIG. 6, switching over of the supply between the first, the second and the third elastomer material can be obtained by substantially using a first and a second valve unit that are similar to that described with reference to FIG. 3, connected in series with each other.

Figure 6:
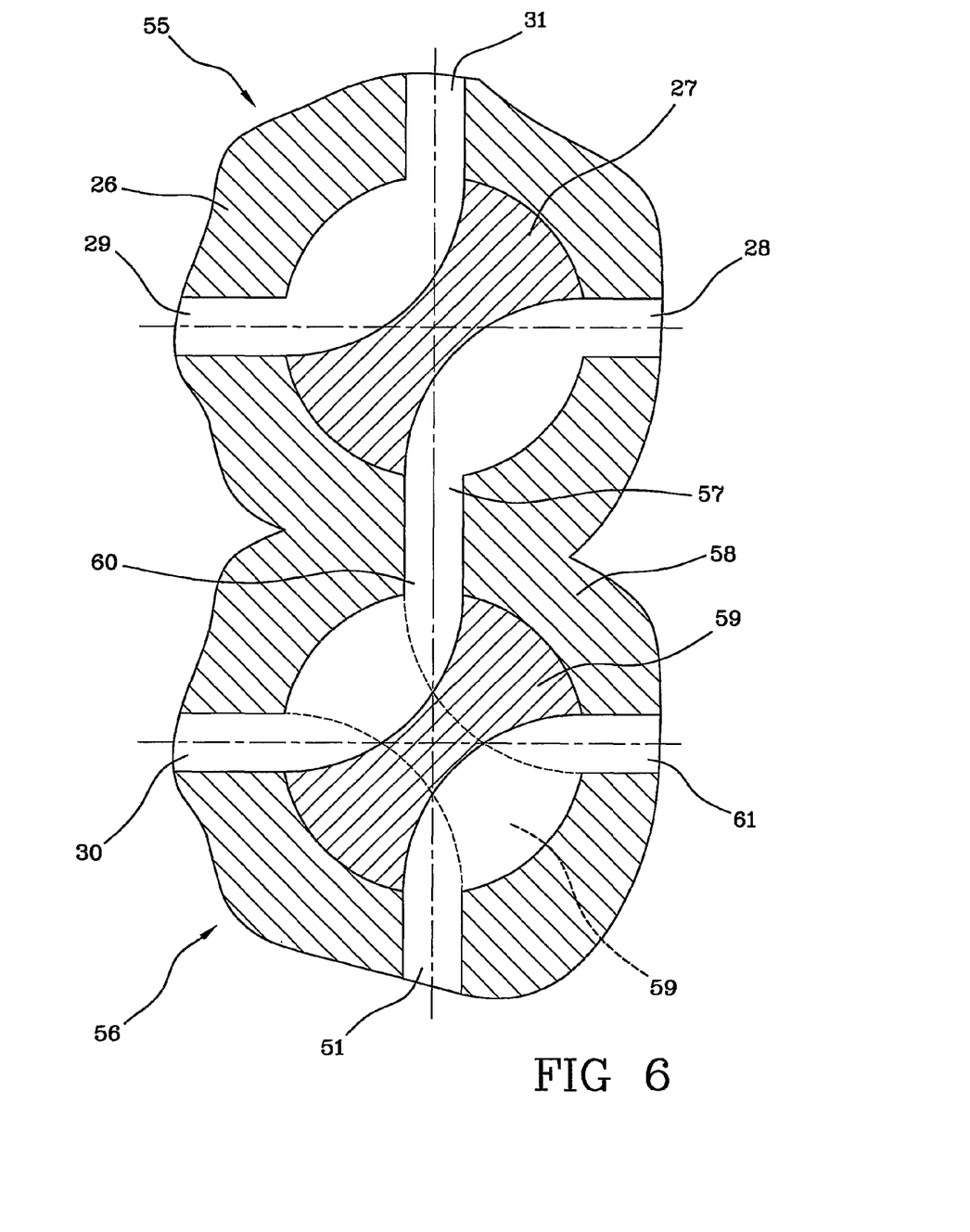
FIG. 6 is a diagrammatic sectional view of a switching valve that can be used in another alternative embodiment of the apparatus.

This first and second valve units are identified with 55 and 56 respectively in FIG. 6. If not otherwise stated, the reference numerals reproduced in FIG. 6 are the same as used for corresponding components of the valve unit 25 previously described with reference to FIG. 3.

As shown in FIG. 6, the first valve unit 55 is provided to have, instead of the primary outlet 30 connected with the delivery nozzle 23, an intermediate outlet 57 that is brought into communication with the first and second inlets 28, 29 respectively, when the distributing member 27 is in the first and second operating conditions.

The second valve unit 56 in turn has a second valve body 58 housing a second distributing member 59 and carrying the primary outlet 30 connected with the delivery nozzle 23. Also formed in the second valve body 58 is the third inlet 51 communicating with the third extruder 47 and an auxiliary inlet 60 communicating with the intermediate outlet 57 of the first valve unit 55.

The primary outlet 30 is selectively brought into communication with the auxiliary inlet 60 and the third inlet 51, when the second distributing member 59 is brought to a first and a second operating condition respectively, as shown in chain line.

Consequently, when the second valve 56 is in the first operating condition, the delivery nozzle 23 lends itself to selectively deliver the first and second elastomer material, when the first valve unit 55 is in the first and in the second operating condition, respectively. Switching over of the second valve unit to the second operating condition, on the contrary, causes delivery of the third elastomer material coming from the third extruder 47, while the material possibly flowing from the first valve unit 55 is deviated towards a second auxiliary outlet 61 connected with the collecting vessel 33.

The invention therefore allows different types of elastomer materials to be supplied from a single outlet nozzle, thus eliminating the necessity to transfer the article being manufactured from an extruder to another to obtain sequential application of the different components co-operating in forming the tyre.

The above brings about an advantageous elimination of the downtime occurring in the known art for carrying out the above mentioned transfer steps.

The invention also allows a great reduction in the overall dimensions of the apparatus for tyre manufacture, because there is no longer a requirement for additional spaces necessary to enable free movement of the robotized arm or arms to transfer the article being manufactured from one extruder to another.

It will be also recognised that the invention allows delivery of the different materials to be switched over without interruption of the flow coming out of the delivery nozzle. This is particularly advantageous in manufacturing components each of which is formed of several parts of different elastomer material, such as a tread band in which the shoulder regions need a blend different from that constituting the centre portion, or sidewalls in which the radially external part is to be made of a different material than the radially internal part. In this case, each of the sidewall parts, the tread band parts or the parts of another constituent element will represent a single component produced with the material coming from a specific extruder, without for that reason giving rise neither to discontinuity in applying the continuous elongated element coming from the delivery nozzle, nor to working downtime.

The invention claimed is:

1. A method of manufacturing tyres, comprising the steps of:
    assembling components of a tyre being processed on a support element, wherein at least one first component is formed through winding of at least one first continuous elongated element into coils arranged one against the other, which first element is made up of a first elastomer material coming from a first extruder, and wherein at least one second component is formed through winding of at least one second continuous elongated element into coils arranged one against the other, which second element is made up of a second elastomer material coming from a second extruder;
    conveying the first and second elastomer materials from the first and second extruders through respective first and second connecting ducts into converging paths connected with a dispenser;
    positioning the support element in front of said dispenser;
    selectively enabling supply, using switching over devices, of the first and second elastomer materials through said dispenser to form the first and second continuous elongated elements, respectively, wherein the switching over devices include a first valve unit for controlling supply of the first and second elastomer materials from the first and second connecting ducts to the dispenser; and
    moving the support element in front of said dispenser for winding and distributing the first and second continuous elongated elements respectively, so as to form the first and second components in succession.

2. The method as claimed in claim 1, wherein said dispenser comprises a delivery nozzle.

3. The method as claimed in claim 1, wherein the step of selectively enabling supply comprises the steps of:
    opening a fluid communication between the dispenser and the first extruder and breaking a fluid communication between the dispenser and the second extruder, in order to enable supply of the first continuous elongated element; and
    opening the fluid communication between the dispenser and the second extruder and breaking the fluid communication between the dispenser and the first extruder in order to enable supply of the second continuous elongated element.

4. The method as claimed in claim 3, further comprising the step of opening a fluid communication between an outlet duct and the first, and alternately, the second extruder, concurrently with breaking of the fluid communication between the dispenser and the first, and, alternately, the second extruder.

5. The method as claimed in claim 3, wherein each of said first and second extruders is activated in advance and deactivated with delay with respect to opening and closing of the fluid communication respectively between the dispenser and the extruder itself.

6. The method as claimed in claim 3, further comprising the step of opening a fluid communication between an outlet duct and a third extruder concurrently with breaking a fluid communication between the dispenser and the third extruder.

7. The method as claimed in claim 6, wherein the third extruder is activated in advance and deactivated with delay with respect to opening and closing respectively of the fluid communication between the dispenser and the third extruder.

8. The method as claimed in claim 1, wherein at least one third component is formed through winding of at least one third continuous elongated element into coils arranged one against the other, said third element consisting of a third elastomer material coming from a third extruder.

9. The method as claimed in claim 8, comprising the steps of:
    enabling supply of the third elastomer material through the dispenser in a selective manner with respect to supply of the first and the second elastomer material; and
    moving the support element in front of the dispenser for winding up and distributing the third continuous elongated element so as to form the third component in succession to said first and second components.

10. An apparatus for manufacturing tyres, comprising:
    at least one support element;
    devices for assembling components of a tyre being processed on the support element, wherein said assembling devices comprise:
    a first extruder to supply a first elastomer material;
    a second extruder to supply a second elastomer material;
    actuating devices designed to carry out a relative movement between said support element and the extruders;
    at least one dispenser communicating with the first and the second extruders through a first and a second connecting ducts respectively, to form a first and a second continuous elongated elements, consisting of said first and second elastomer materials, respectively, including a first dispenser communicating with the first and second extruders through the first and a second ducts; and
    switching over devices to selectively enable supply of the first and second elastomer materials through said first dispenser, wherein the switching over devices include a first valve unit for controlling supply of the first and second elastomer materials from the first and second connecting ducts to the first dispenser.

11. The apparatus as claimed in claim 10, wherein said first and second connecting ducts open out into said first dispenser following substantially converging paths.

12. The apparatus as claimed in claim 10, wherein said first dispenser comprises an outlet port communicating with said connecting ducts.

13. The apparatus as claimed in claim 10, wherein said first valve unit comprises:
    a valve body having a first and a second inlets communicating with the first and the second extruders respectively, and a primary outlet communicating with said first dispenser; and
    a distributing member operatively engaged in the valve body and movable between a first operating condition in which the primary outlet communicates with the first inlet and a second operating condition in which the primary outlet communicates with the second inlet.

14. The apparatus as claimed in claim 13, wherein the valve body further comprises at least one auxiliary outlet connected with an outlet duct communicating with the second inlet when the distributing member is in the first operating condition, and communicating with the first inlet when the distributing member is in the second operating condition.

15. The apparatus as claimed in claim 13, wherein the first and second inlets are located on the valve body at diametrically opposite positions.

16. The apparatus as claimed in claim 14, wherein said primary and auxiliary outlets are located on the valve body at diametrically opposite positions.

17. The apparatus as claimed in claim 13, wherein said distributing member comprises a partition element diametrically extending in a distributing chamber defined in the valve body to divide said chamber into a first and a second passageways communicating with the first and the second inlets, said partition element being susceptible to angular rotation between the first and second operating conditions.

18. The apparatus as claimed in claim 13, wherein the first and second inlets are located on the valve body at respectively aligned positions on an inlet side opposite to an outlet side carrying the primary outlet.

19. The apparatus as claimed in claim 14, wherein said primary and auxiliary outlets are located at respectively aligned positions on an outlet side of the valve body opposite to an inlet side carrying said first and second inlets.

20. The apparatus as claimed in claim 18, wherein the distributing member has:
a first series of channels extending from the inlet side to the outlet side of the valve body to connect the first inlet to the primary outlet when the distributing member is in the first operating condition; and
a second series of channels extending from the inlet side to the outlet side of the valve body to connect the second inlet to the primary outlet when the distributing member is in the second operating condition.

21. The apparatus as claimed in claim 10, wherein said assembling devices further comprise:
a third extruder to supply a third elastomer material; and
a third connecting duct to connect the first dispenser with the third extruder, said switching over devices being set to enable supply of the third elastomer material through the first dispenser selectively with respect to supply of the first and second elastomer materials.

22. The apparatus as claimed in claim 21, wherein said switching over devices comprise:
a valve body having a first, a second and a third inlet communicating with the first, second and third extruder, respectively; and
a distributing member operatively engaged in the valve body and movable between a first operating condition in which a primary outlet of the valve body communicates with the first inlet, a second operating condition in which the primary outlet communicates with the second inlet, and a third operating condition in which the primary outlet communicates with the third inlet.

23. The apparatus as claimed in claim 22, wherein the valve body further comprises at least one auxiliary outlet opening into an outlet duct communicating with the second and the third inlet when the distributing member is in the first operating condition, communicating with the first and the third inlet when the distributing member is in the second operating condition, and communicating with the first and the second inlet when the distributing member is in the third operating condition.

24. The apparatus as claimed in claim 22, wherein the first, second and third inlets are disposed on the valve body at respectively aligned positions on an inlet side opposite to an outlet side carrying the primary outlet.

25. The apparatus as claimed in claim 23, wherein said primary and auxiliary outlets are located at respectively aligned positions on an outlet side of the valve body opposite to an inlet side carrying the first, second and third inlets.

26. The apparatus as claimed in claim 24, wherein the distributing member comprises:
a first series of channels extending from the inlet side to the outlet side of the valve body to connect the first inlet to the primary outlet when the distributing member is in the first operating condition;
a second series of channels extending from the inlet side to the outlet side of the valve body to connect the second inlet to the primary outlet when the distributing member is in the second operating condition; and
a third series of channels extending from the first to the second side of the valve body to connect the third inlet to the primary outlet when the distributing member is in the third operating condition.

27. The apparatus as claimed in claim 21, wherein said switching over devices comprise said first valve unit comprising:
a valve body having a first and a second inlets communicating with the first and the second extruders respectively, and an intermediate outlet;
a distributing member operatively engaged in the valve body and movable between a first operating condition in which the intermediate outlet communicates with the first inlet, and a second operating condition in which the intermediate outlet communicates with the second inlet;
a second valve unit comprising:
a second valve body having an auxiliary inlet communicating with the intermediate outlet of the first valve unit, a third inlet communicating with the third extruder, and a primary outlet communicating with said first dispenser; and
a second distributing member movable between a first operating condition in which the primary outlet communicates with the auxiliary inlet, and a second operating condition in which the primary outlet communicates with the third inlet.

28. The apparatus as claimed in claim 10, wherein said first dispenser comprises a delivery nozzle.

* * * * *